Figure 1:
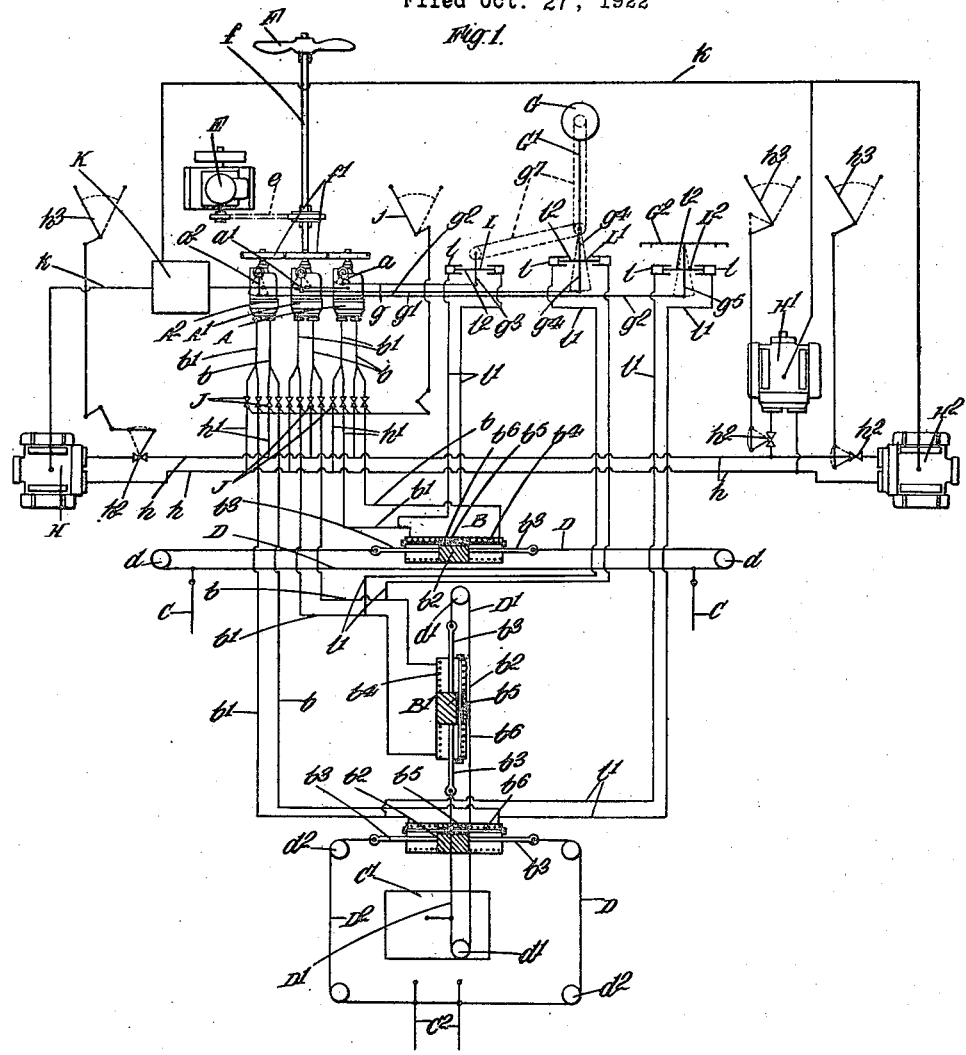

Nov. 18, 1924.

O. H. D. VICKERS ET AL 1,516,164

CONTROL OF AIRCRAFT

Filed Oct. 27, 1922

Patented Nov. 18, 1924.

1,516,164

UNITED STATES PATENT OFFICE.

OLIVER HENRY DOUGLAS VICKERS AND MAURICE KERR INGOLDBY, OF WESTMINSTER, LONDON, ENGLAND, ASSIGNORS TO VICKERS LIMITED, OF LONDON, ENGLAND.

CONTROL OF AIRCRAFT.

Application filed October 27, 1922. Serial No. 597,242.

*To all whom it may concern:*

Be it known that we, OLIVER HENRY DOUGLAS VICKERS and MAURICE KERR INGOLDBY, both subjects of the King of Great Britain, residing at Vickers House, Broadway, Westminster, in the county of London, England, have invented certain new and useful Improvements in or Relating to the Control of Aircraft, of which the following is a specification.

This invention relates to the control of aircraft and provides improved means by which the control may be effected without calling for substantial effort from the pilot.

According to this invention the control is effected through a servo-motor system comprising an independent servo-motor for each kind of control, the servo-motor being driven by power derived from the motion of the air-craft or from an independent source or both.

The servo-motor is preferably one comprising a small pump unit of the variable delivery type, as employed for example in the Williams-Janney hydraulic gear, and a double acting hydraulic ram connected to the said pump and provided with a leakage adjusted to give the desired displacement on either side of the mean position according to the regulation of the delivery control of the pump unit. Three servo-motor systems of this type are provided respectively for fore and aft control, lateral control and directional control, and for the manual control of the aircraft by the pilot either the control column and rudder bar or an auxiliary set of controls is provided with operative connections to the three pump delivery controls.

In the control of the machine by the pilot it is very desirable that the pilot shall be able to feel the control and for this purpose sensitive gear is provided which enables the pilot to feel directly the extent to which the various control members are under tension. To give the required sensitiveness a device is provided for each control lever that is some fraction of the actual effort of the servo-motor and a convenient method of giving such back pressure to the control lever in a servo-motor system of the kind above described is to carry a small by-pass at each end of each of the rams from the supply pipes leading to the rams and to actuate by these by-passes a small diaphragm or double piston device connected to the control lever in the direction in which this lever is moved for the particular control in question.

The servo-motor control may also be provided with means by which it can be thrown out of action instantly and the ordinary manual control established.

In order that the said invention may be clearly understood and readily carried into effect, the same will now be described more fully with reference to the accompanying drawings, in which:—

Figure 2:
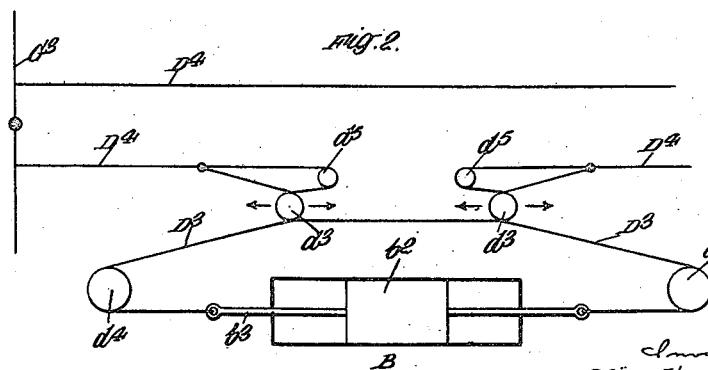

Figure 1 is a diagram showing the general arrangement of a servo-motor system for aircraft control embodying the present invention; and Figure 2 is a detail view showing a device for changing over the servo-motor control to direct control.

A, $A^1$, $A^2$ are the pump units of three hydraulic gears of the Williams-Janney type. B, $B^1$, $B^2$ are three hydraulic rams corresponding to the pump units and connected at opposite ends to the pumps by the connections $b$, $b^1$. C, $C^1$, $C^2$ are the control surfaces of the air craft, C representing ailerons or equivalent devices for lateral control, $C^1$ a horizontal rudder for fore and aft control and $C^2$ vertical rudders for directional control. D, $D^1$, $D^2$ are flexible driving connections or cords between the pistons $b^2$ and piston rods $b^3$ of the rams and the control surfaces C, $C^1$, $C^2$, the cords passing over the pulleys $d$, $d^1$, $d^2$ so that the control surfaces are operated in opposite directions according to the direction in which the flexible connections D, $D^1$, $D^2$ are pulled.

E is an electric motor and F is a fan driving mutually the three pump units A, $A^1$, $A^2$ through the fan or propeller shaft $f$ and the gear wheels $f^1$, the motor E driving the fan shaft through the chain gear $e$. The delivery control levers $a$, $a^1$ of the pump units A $A^1$ are operated by the hand wheel G and hand control lever $G^1$ through the rods $g$, $g^1$ and lever arms $g^3$, $g^4$. The arm $g^3$ is on a spindle $g^6$ and turned through the chain gearing $g^7$ from the hand wheel G, while the arm $g^4$ may form a continuation of the hand lever $g^1$. The delivery control lever $a^2$ of the pump $A^2$ is operated by the lever $G^2$ acting through the rod $g^2$ and arm $g^5$.

H, $H^1$, $H^2$ indicate three motor units of the hydraulic gear which can be employed for any operation required when the aircraft control system is not in use, the motors H, H¹, H² serving, for example, for starting the aircraft engine, working bilge pumps, pumping petrol, or in the case of an amphibian machine operating the retractable under-carriage. They are connected to the pump units A, A¹, A² by the tubes $h$, $h^1$ provided with valves $h^2$ under the control of hand levers $h^3$ by which each motor can be connected up with the system or cut off as required. J, J are valves under the common control of a hand lever $j$, provided in the entire set of tubular connections leading from the pump units to the rams and motors, allowing the rams to be cut off from the pump units at a single operation and the auxiliary motor system H, H¹, H² to be connected up. K is a reservoir connected up by the pipes $k$ to the pump and motor casings.

When the aircraft is in flight the pump units A, A¹, A² may be driven entirely by the passage of air past the fan F, the motor E being cut out, or both the motor and fan may be in operation simultaneously. If the apparatus is required for driving auxiliary motors when the aircraft is not in flight the drive may be entirely from the motor E. Each of the rams B, B¹, B² has a double acting piston $b^2$ under the control of springs $b^4$ and provided with a leakage aperture $b^5$ with a choke rod $b^6$ giving a variable leak between the two ends of the ram cylinder, which as shown are connected to the opposite sides of the corresponding pump unit so that liquid is forced in by the pump at one end of the ram cylinder and is withdrawn at the other at a rate corresponding to the adjustment of the control levers $a$, $a^1$, $a^2$, which operate the usual swash plate or equivalent device varying the delivery of the pump from zero to a maximum in either direction. The springs $b^4$ tend to return the piston $b^2$ to its central position with a force depending upon the displacement of the piston and the choke rod $b^6$ is so shaped relatively to the aperture $b^5$ in the piston as to give the desired ratio of movement of the ram relatively to the adjustment of the pump unit. The rams are shown diagrammatically only and any of the variable leak devices described in specification No. 30053 of 1921 above referred to may be employed.

The arrangement of flexible connections D, D¹, D² is diagrammatic and may be taken to represent any connections between the various aircraft control surfaces C, C¹, C² and the ram pistons. With the arrangement of wires or cords and pulleys indicated it will be seen that if the piston $b^2$ of the ram B is moved in one direction the flexible connections will operate in one sense on the ailerons C, while if the movement of the piston is in the opposite direction the ailerons will be displaced in the opposite sense to an angle depending on the displacement of the piston. Similarly with the other controls of the aircraft the movement in sense and extent will depend upon the direction and amount of displacement of the corresponding ram piston and as the variation of the choking effect of each ram can be adjusted to give any required ratio of displacement to pump delivery the movement of the ram pistons can be arranged to vary with the movement of the initial hand controlling members G, G¹, G².

The sensitive gear to enable the pilot to feel the control, in spite of the operation through a servo-motor system, comprises a set of double piston devices, L, L¹, L², the cylinders $l$ of which are connected by the pipes $l^1$ to the pipes or tubes $b$, $b^1$ leading from the two ends of the rams to the two sides of the pump units. The pistons are connected by the rods $l^2$ to the lever arms $g^3$, $g^4$ and $g^5$ of the respective hand control devices so that the pilot for every control operation will feel a response to the manual movement depending upon the fluid pressure in the servo-motor system, that is, varying with the actual force employed to operate the control surfaces.

If it should be desired to throw the servo-motor system out of action and establish ordinary manual control in its place a device such as is indicated diagrammatically in Figure 2 may be employed, in which cords or wires $D^3$ connected to the opposite ends of the piston rod of the ram pass over pulleys $d^3$ and are attached to the operating cord or wire $D^4$, which double pulleys $d^3$ are arranged to be movable towards and away from each other, preferably moving in one direction under the control of a spring. The wires $D^3$ also pass over the stationary pulleys $d^4$. When the pulleys $d^3$ are drawn towards one another the wire $D^3$ is kept taut and the ram can operate the control wire $D^4$. The wire $D^4$ is connected both to the control surface of the aircraft and to the manually operated lever indicated diagrammatically at $G^0$. The wire $D^4$ is arranged to form a loop passing over the stationary pulleys $d^5$ and the movable pulleys $d^3$. When the pulleys $d^3$ are drawn towards each other the loop of the wire $D^4$ is slack, while the auxiliary wire $D^3$ is taut, but when the pulleys $d^3$ are separated the loop $D^4$ is tightened and the ram connection $D^3$ is slackened, so that the ram is inoperative and the control is then effected manually through the lever or equivalent device $G^0$.

What we claim and desire to secure by Letters Patent of the United States is:—

1. In a control mechanism for aircraft a plurality of control surfaces, an independent servo-motor system for each control surface, a source of power for the said servo-motors, means under the operation of the pilot for adjusting the work of each of the said servo-motors, and a sensitive gear interposed between the servo-motor system and the mechanism under the operation of the pilot, whereby a resistance is offered to the pilot-operated mechanism varying with the range of the control operation.

2. In a control mechanism for aircraft, a plurality of control surfaces, a hydraulic servo-motor system for each control system, which servo-motor system comprises a variable delivery pump and a motor, a source of power driving the said variable pump, and means operated by the pilot for varying the delivery of each pump and consequently determining the movement of the corresponding control surface, and a liquid by-pass led from the motor side of each hydraulic gear and a pressure-applying device connected to the pilot-operated mechanism and to the aforesaid by-pass, whereby the variable pressure in the hydraulic system gives a variable resistance to the pilot's operation.

3. In control mechanism for aircraft, a plurality of control surfaces, a hydraulic servo-motor system for each of the said surfaces, which system comprises a variable delivery hydraulic pump and a double acting ram with resiliently controlled piston and a variable leakage channel from one side to the other of the said piston, a source of power for the said variable delivery pump and means under the operation of the pilot for varying the delivery of the pump and consequently determining the movement of the corresponding control surface.

4. In control mechanism as claimed in claim 3, flexible connecting means between the said double acting ram and the corresponding aircraft control surfaces, direct flexible connections between the same surfaces and the mechanism operated directly by the pilot, and means whereby the said flexible connections from the ram and the pilot operated mechanism are alternatively tightened up and slackened, whereby the air craft control surfaces are placed at will under the control of the hydraulic ram or of the pilot operated mechanism.

OLIVER HENRY DOUGLAS VICKERS.
MAURICE KERR INGOLDBY.